US012380800B2

(12) United States Patent
Tin

(10) Patent No.: US 12,380,800 B2
(45) Date of Patent: Aug. 5, 2025

(54) METHOD FOR ADJUSTING BACKOFF MECHANISM AND VEHICLE COMMUNICATION SYSTEM

(71) Applicant: Wistron Corporation, New Taipei (TW)

(72) Inventor: Hsiao-Wen Tin, New Taipei (TW)

(73) Assignee: Wistron Corporation, New Taipei (TW)

( * ) Notice: Subject to any disclaimer, the term of this patent is extended or adjusted under 35 U.S.C. 154(b) by 314 days.

(21) Appl. No.: 18/336,952

(22) Filed: Jun. 16, 2023

(65) Prior Publication Data

US 2024/0386792 A1 Nov. 21, 2024

(30) Foreign Application Priority Data

May 18, 2023 (TW) ................................ 112118495

(51) Int. Cl.
*G08G 1/01* (2006.01)
*G08G 1/0967* (2006.01)

(52) U.S. Cl.
CPC ......... *G08G 1/0116* (2013.01); *G08G 1/0129* (2013.01); *G08G 1/096775* (2013.01)

(58) Field of Classification Search
CPC ............... G08G 1/0116; G08G 1/0129; G08G 1/096775
USPC .......................................................... 701/117
See application file for complete search history.

(56) References Cited

U.S. PATENT DOCUMENTS 9,257,041 B2 * 2/2016 Scofield ............... G08G 1/0104
2011/0112747 A1 5/2011 Downs et al.

FOREIGN PATENT DOCUMENTS

KR 20210006317 A * 1/2021 ........... G08G 1/0104

* cited by examiner

*Primary Examiner* — Isaac G Smith
(74) *Attorney, Agent, or Firm* — JCIPRNET

(57) ABSTRACT

Embodiments of the disclosure provide a method for adjusting a backoff mechanism and a vehicle communication system. The method includes the following. Vehicle information of each vehicle in multiple road segments is obtained. Current traffic flow information of each of the road segments is determined based on the vehicle information of each of the vehicles. Multiple probabilities corresponding to each of the road segments are determined at least according to the current traffic flow information of each of the road segments, in which the multiple probabilities corresponding to each of the road segments correspond to multiple candidate contention window sizes respectively. A contention window size corresponding to each of the road segments is determined based on the multiple probabilities corresponding to each of the road segments. A message retransmission mechanism of multiple first vehicles is controlled according to the contention window size corresponding to a first road segment.

19 Claims, 3 Drawing Sheets

METHOD FOR ADJUSTING BACKOFF MECHANISM AND VEHICLE COMMUNICATION SYSTEM

CROSS-REFERENCE TO RELATED APPLICATION

This application claims the priority benefit of Taiwan application serial no. 112118495, filed on May 18, 2023. The entirety of the above-mentioned patent application is hereby incorporated by reference herein and made a part of this specification.

BACKGROUND

Technical Field

The disclosure relates to a vehicle communication technology, and in particular to a method for adjusting a backoff mechanism and a vehicle communication system.

Description of Related Art

In recent years, in order to improve road safety, smart cities, etc., coupled with the rapid development of 5G, artificial intelligence (AI), and autonomous driving, the Internet of Vehicles has become one of clearly demanded and promising types of IoT in the market.

Vehicular ad hoc networks (VANET) is a high-profile technology that can realize communication between autonomous vehicles and traditional vehicles in unmanned driving in future traffic. VANET applications may be mainly divided into two categories, traffic safety applications and traffic management applications. There are two common VANET communication methods: (1) 5.9 GHz dedicated short-range communication (DSRC); (2) cellular-based vehicular communication.

With the rapid development of the fifth-generation communication system (hereinafter referred to as 5G) technology for connecting and autonomous driving vehicles, the industry is inclined to support the cellular-based communication technology, which is called the cellular vehicle to everything (C-V2X) communication. But such C-V2X communication still requires roadside units (RSU) or some kind of base station near the road as an infrastructure component to collect and process traffic and vehicle data.

Studies have pointed out that about 60% of accidents may be controlled if the driver is warned half a second before the collision of the vehicle. Therefore, effective delivery of information can play a key role in safe and smooth driving. In VANET, the transmission range of vehicles is limited (approximately 300 to 1000 m). Therefore, the collective contribution of all vehicles is required to reach the target coverage area. Unfortunately, the decentralized VANET architecture with a large number of simultaneous transmissions makes reliable and secure broadcasting a much-discussed research challenge.

A few years ago, the US Federal Communications Commission (FCC) approved 75 MHz (5.850 to 5.925 GHz) of spectrum for use in multi-channel VANET environments. The frequency spectrum is divided into one control channel (CCH) and six service channels (SCH). The DSRC standard specifies a channel switching scheme to allow vehicles to switch between these two classes of applications. In addition, the DSRC standard also recommends that the vehicle should access the CCH every 100 milliseconds (this is called the synchronization interval, SI) to send and receive related status messages, and then the status messages may be transmitted reliably and within an acceptable delay range to adjacent vehicles.

Typically, the internal collision occurring within a single vehicle may be resolved by the scheduler by allowing the highest priority access class (AC) to transmit first, while having lower priority ACs execute (random) backoff. However, an external collision occurs when the same AC queue of different vehicles (for example, AC0 of a vehicle 1 and a vehicle 2) is granted transmission opportunities (TXOP) at the same time.

When a collision occurs, (random) backoff is a scheme commonly used to solve contention problems between different vehicles wishing to transmit data simultaneously. When a vehicle performs a (random) backoff procedure, the vehicle waits for the duration of an additional, randomly selected time slot, and the randomly selected time slot has to be greater than 0 and smaller than CW.

Since the vehicles have no priority, but have equal opportunity to access the channel, data packets may collide again when choosing the same backoff time slot. This is a serious problem for broadcasting safety packets on the CCH, since there may be hundreds of vehicles in the affected area, so the probabilities of any given time slot being selected by only one vehicle are very low.

Unlike unicast transmissions, successful reception is not acknowledged in broadcast mode, so collisions cannot be detected. Also, if the initially selected contention window (CW) size remains unchanged, this may further cause more collisions.

SUMMARY

In view of this, the disclosure provides a method for adjusting a backoff mechanism and a vehicle communication system, which may be used to solve the above technical problems.

An embodiment of the disclosure provides a method for adjusting a backoff mechanism suitable for a vehicle communication system, in which the vehicle communication system includes a server. The method includes the following. Vehicle information of each of a plurality of vehicles in a plurality of road segments is obtained by the server, in which the vehicle information of each of the plurality of vehicles includes corresponding communication information and movement information, the plurality of road segments include a first road segment, and the plurality of vehicles include a plurality of first vehicles positioned in the first road segment. Current traffic flow information of each of the plurality of road segments is determined based on the vehicle information of each of the plurality of vehicles by the server. A plurality of probabilities corresponding to each of the plurality of road segments are determined at least according to the current traffic flow information of each of the plurality of road segments by the server, in which the plurality of probabilities corresponding to each of the plurality of road segments correspond to a plurality of candidate contention window sizes respectively. A contention window size corresponding to each of the plurality of road segments is determined based on the plurality of probabilities corresponding to each of the plurality of road segments by the server. A message retransmission mechanism of the plurality of first vehicles is controlled according to the contention window size corresponding to the first road segment by the server.

An embodiment of the disclosure provides a vehicle communication system including a server. The server is configured to perform the following. Vehicle information of each of a plurality of vehicles in a plurality of road segments is obtained, in which the vehicle information of each of the plurality of vehicles includes corresponding communication information and movement information, the plurality of road segments include a first road segment, and the plurality of vehicles include a plurality of first vehicles positioned in the first road segment. Current traffic flow information of each of the plurality of road segments is determined based on the vehicle information of each of the plurality of vehicles. A plurality of probabilities corresponding to each of the plurality of road segments are determined at least according to the current traffic flow information of each of the plurality of road segments, in which the plurality of probabilities corresponding to each of the plurality of road segments correspond to a plurality of candidate contention window sizes respectively. A contention window size corresponding to each of the plurality of road segments is determined based on the plurality of probabilities corresponding to each of the plurality of road segments. A message retransmission mechanism of the plurality of first vehicles is controlled according to the contention window size corresponding to the first road segment.

DESCRIPTION OF THE EMBODIMENTS

Figure 1:
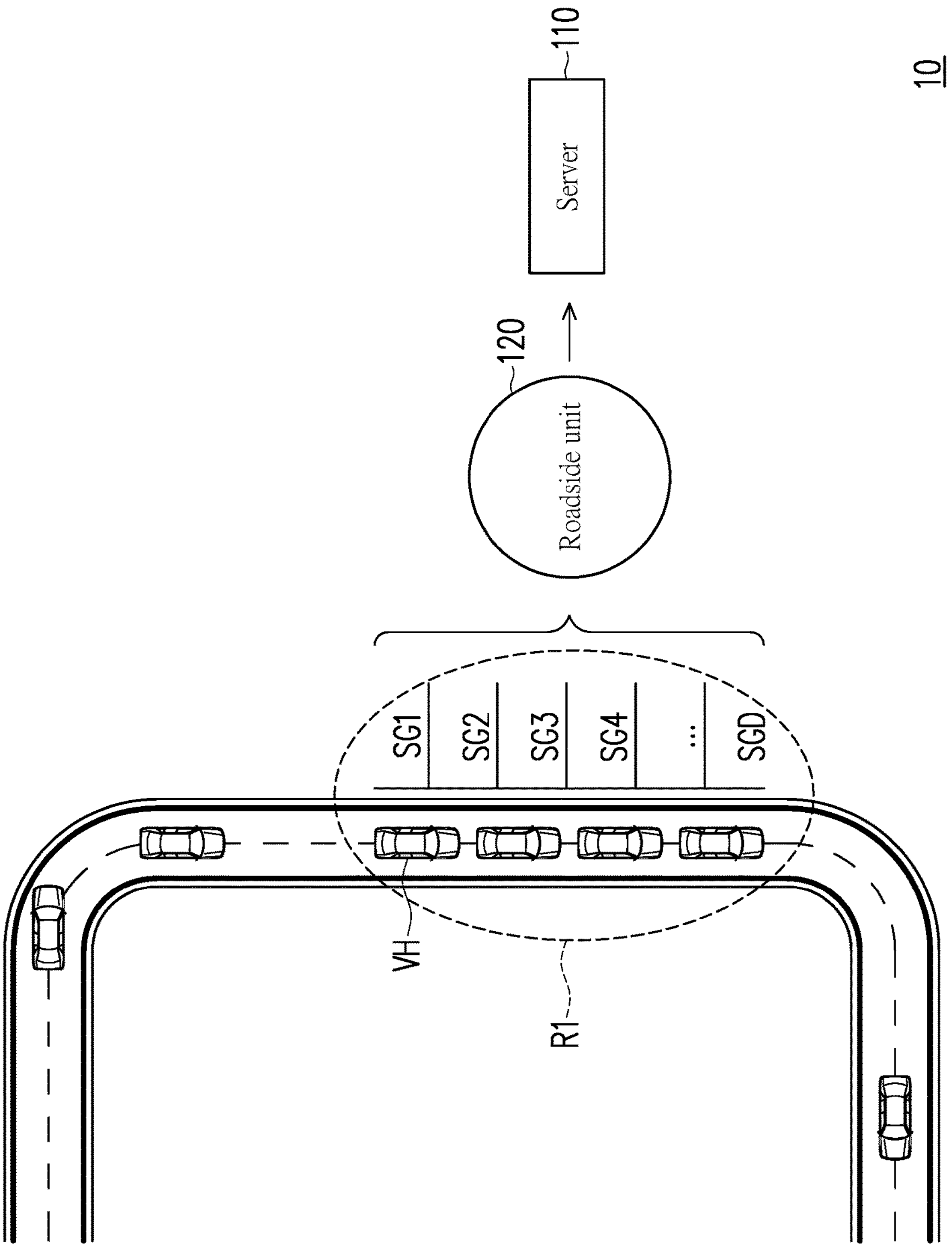
FIG. 1 is a schematic diagram of a vehicle communication system according to an embodiment of the disclosure.

Please refer to FIG. 1, which is a schematic diagram of a vehicle communication system according to an embodiment of the disclosure. In FIG. 1, a vehicle communication system 10 includes a server 110, an RSU 120, and a plurality of vehicles VH, in which the server 110 is, for example, a cloud server and/or a vehicle communication server, which may be used to receive various data from one or more RSUs 120, but is not limited thereto.

In the embodiment of the disclosure, the vehicle communication system 10 may, for example, form a VANET. For persons skilled in the art, VANET is a wireless ad hoc network, which provides communication between vehicles and on board unit (OBU) and RSU, aiming at providing a wireless environment for different vehicles or passengers to exchange information.

VANET mainly includes the following three parts: (1) OBU, RSU, and trust authority (TA), and different types of data (such as position information, road condition information, and emergency information) may be transmitted in VANET. The purpose of VANET is to provide ubiquitous connectivity with mobile users on the road and provide efficient vehicle-to-vehicle (V2V) communication, making the intelligent transportation systems (ITS) possible.

In FIG. 1, the RSU 120 has, for example, a covering range R1 (for example, the communication range covered by the communication capability of the RSU 120), and the vehicle VH within the covering range R1 communicates through the RSU 120. In addition, vehicles outside the covering range R1 (such as vehicles outside the dotted line) use V2V communication and vehicle-to-infrastructure (V2I) communication, and V2V communication and V2I communication have to realize based on a corresponding wireless communication protocol.

In FIG. 1, the covering range R1 of the RSU 120 may include, for example, one or more roads, and the one or more roads may be divided into a plurality of road segments SG1 to SGD (D is a quantity of road segments and a positive integer). The aspects (such as length, width) of the road segments SG1 to SGD shown in FIG. 1 are for example only, and are not intended to limit the possible implementation manners of the disclosure. In different embodiments, a designer may determine the appearance of each road segment SG1 to SGD according to requirements.

As mentioned above, the vehicle within the covering range R1 may communicate with the RSU 120, which means that each vehicle VH positioned on each road segment SG1 to SGD may communicate with the RSU 120.

In some embodiments, the RSU 120 may obtain corresponding vehicle information from each vehicle VH of each road segment SG1 to SGD, and the vehicle information of each vehicle VH includes, for example, corresponding communication information and movement information.

In an embodiment, the communication information of each vehicle VH includes, for example, vehicle communication information corresponding to each vehicle VH (such as various road condition information and/or emergency information). In addition, the movement information of each vehicle VH is, for example, corresponding global positioning system (GPS) information, which may include a vehicle position and a moving speed of each vehicle VH, but is not limited thereto.

In an embodiment, after the RSU 120 obtains the corresponding vehicle information from each vehicle VH of each road segment SG1 to SGD, the RSU 120 may provide the collected vehicle information of each vehicle VH to the server 110 for further analysis.

Similarly, the server 110 may also obtain vehicle information collected by RSUs from other managed RSUs, and the server 110 may similarly control/configure vehicles corresponding to each RSU based on the information obtained from each RSU.

In order to facilitate understanding of the concept of the disclosure, the following only uses the RSU 120 and the corresponding road segments thereof SG1 to SGD as an example for illustration, and persons skilled in the art should be able to understand other operations executed by the server 110 based on information collected by other RSUs.

In the embodiment of the disclosure, the server 110 may be, for example, implemented as various smart devices and/or computer devices, but is not limited thereto. In some embodiments, the server 110 may include a storage circuit and a processor, in which the storage circuit is, for example, any type of fixed or removable random access memory (RAM), read-only memory (ROM), flash memory, hard disk or other similar devices or a combination of these devices, and may be used to record a plurality of program codes or modules.

In addition, the processor in the server 110 is coupled to the storage circuit, and may be a general-purpose processor, a special-purpose processor, a traditional processor, a digital signal processor, a plurality of microprocessors, one or more microprocessors combined with digital signal processor cores, a controller, a microcontroller, an application specific integrated circuit (ASIC), a field programmable gate array (FPGA), any other types of integrated circuits, state machines, advanced RISC Machines (ARM)-based processors, and the like.

In the embodiment of the disclosure, the processor of the server 110 may access the modules and program codes recorded in the storage circuit to implement a method for adjusting a backoff mechanism proposed by the disclosure, the details of which are described below.

Figure 2:
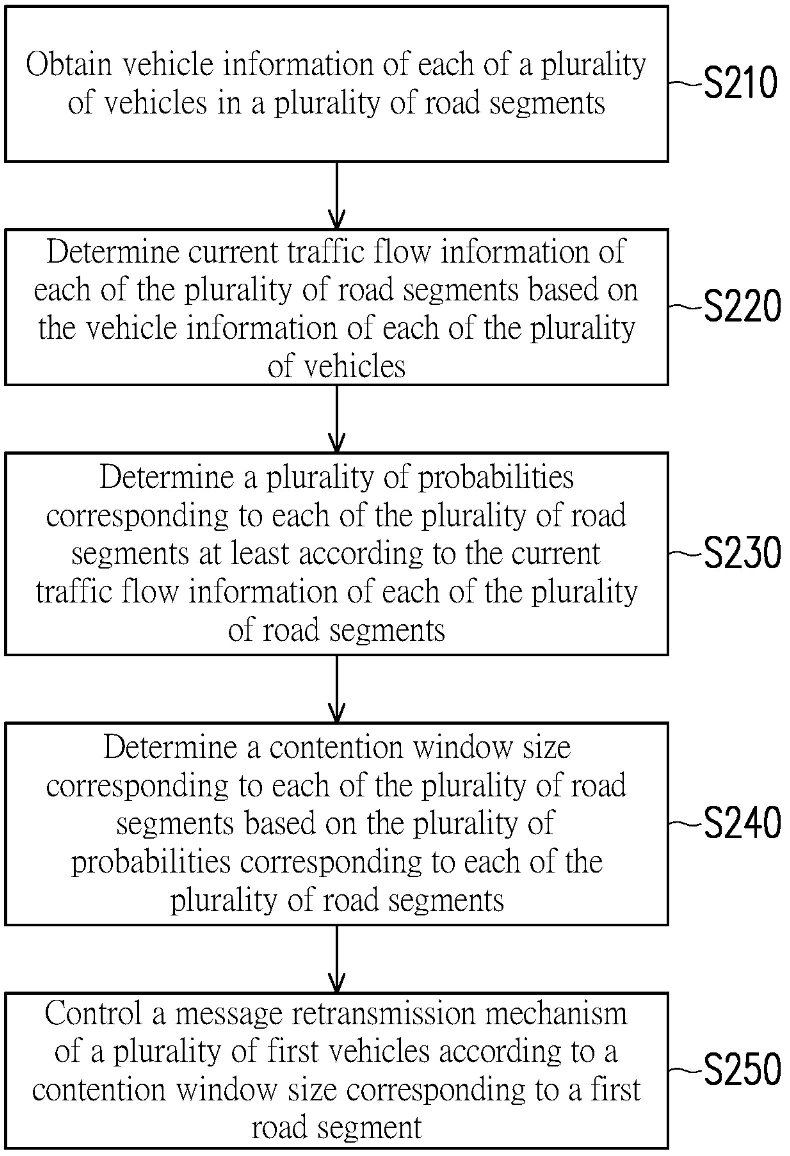
FIG. 2 is a flowchart of a method for adjusting a backoff mechanism according to an embodiment of the disclosure.

Please refer to FIG. 2, which is a flowchart of a method for adjusting the backoff mechanism according to an embodiment of the disclosure. The method of this embodiment may be executed by the server 110 in FIG. 1, and the details of each operation in FIG. 2 will be described below with the components shown in FIG. 1.

First, in Step S210, the server 110 obtains vehicle information of each of the plurality of vehicles VH in the plurality of road segments SG1 to SGD. For ease of description, it is assumed below that the vehicle information of each vehicle VH obtained by the server 110 includes the vehicle position, moving speed, and road condition information of each vehicle VH, but it is not limited thereto.

In Step S220, the server 110 determines current traffic flow information of each road segment SG1 to SGD based on the vehicle information of each vehicle VH.

In an embodiment, the current traffic flow information of a d-th road segment (d is an index value) of the road segments SG1 to SGD may be represented as:

$$X_d(t) = [x_{d,1}(t), x_{d,2}(t), \ldots, x_{d,V}(t)],$$

in which t is a time index value, $x_{d,i}(t)$ represents the vehicle information of an i-th vehicle among a plurality of vehicles in the d-th road segment, $1 \le i \le V$, i is an integer, and V is a quantity of the plurality of vehicles in the d-th road segment.

In an embodiment, $x_{d,i}(t)$ may be represented as:

$$x_{d,i}(t) = \begin{bmatrix} R_{speed_{d,i}}(t) \\ R_{pos_{d,i}}(t) \\ M_{d,i}(t) \end{bmatrix},$$

in which $R_{speed_{d,i}}(t)$ is a moving speed of the i-th vehicle in the d-th road segment, $R_{pos_{d,i}}(t)$ is a vehicle position of the i-th vehicle in the d-th road segment (which may be represented by GPS coordinates), and $M_{d,i}(t)$ is vehicle communication information of the i-th vehicle in the d-th road segment.

In an embodiment, for the i-th vehicle in the d-th road segment, whose $R_{speed_{d,i}}(t)$, $R_{pos_{d,i}}(t)$, and $M_{d,i}(t)$ corresponding to a t0-th time point to a t2-th time point may be shown in Table 1 as below examples, but may not be limited thereto.

| Time point (t) | Moving speed ($R_{speed_{d,i}}$) | Vehicle position ($R_{pos_{d,i}}$) | Road condition ($M_{d,i}(t)$) |
|---|---|---|---|
| t0 | 60.5 | (25.123, 121.567) | Traffic jam at an intersection |
| t1 | 61.2 | (25.123, 121.566) | Wet road condition |
| t2 | 62.0 | (25.123, 121.565) | Smooth |
| . . . | . . . | . . . | . . . |

In an embodiment, the current traffic flow information corresponding to the road segments SG1 to SGD at a t-th time point may be represented as $X_1(t)$–$X_D(t)$ respectively.

Afterward, in Step S230, the server 110 determines the plurality of probabilities corresponding to each road segment SG1 to SGD at least according to the current traffic flow information of each road segment SG1 to SGD, in which the plurality of probabilities corresponding to each road segment SG1 to SGD correspond to a plurality of candidate contention window sizes respectively. Each road segment SG1 to SGD may correspond to S candidate contention window sizes, and the S candidate contention window sizes corresponding to the d-th road segment may be represented as $CW_{d,1}(t)$~$CW_{d,S}(t)$, but is not limited thereto.

In an embodiment, during a process of executing Step S230, the server 110 may obtain at least one piece of historical traffic flow information of each road segment SG1 to SGD. Taking the d-th road segment as an example, at least one piece of corresponding historical traffic flow information (a quantity of which is, for example, M) may be represented as $X_d(t-1)$~$X_d(t-M)$, but is not limited thereto. In an embodiment, $X_d(t-k)$ is, for example, the historical traffic flow information corresponding to a t-k-th time point, and may also be understood as the current traffic flow information at the t-k-th time point (k is a positive integer), but may not be limited thereto.

Afterward, the server 110 may determine the plurality of probabilities corresponding to each road segment SG1 to SGD based on the current traffic flow information and the at least one piece of historical traffic flow information corresponding to each road segment SG1 to SGD.

In an embodiment, the server 110 may integrate the current traffic flow information and the at least one piece of historical traffic flow information of each road segment SG1 to SGD into corresponding statistical traffic flow information. Taking the d-th road segment as an example, the statistical traffic flow information corresponding to the t-th time point may be represented as:

$$\widehat{X_d}(t) = \sum_{k=0}^{M} h_0(k) X_d(t-k),$$

in which $h_0(k)$ is a k-th coefficient in an impulse response (denoted by h(t)).

In an embodiment, each coefficient of the impulse response h(t) may be determined by the designer according to requirements, but is not limited thereto. In an embodiment, the impulse response h(t) describes a response of the system to a unit impulse signal in time, which may be known through mathematical tools such as Fourier transform or Laplace transform. The coefficient $h_0(k)$ in the impulse response in this formula describes a response strength and a time delay of an input signal of a k-th time unit.

Based on this, in an embodiment, the statistical traffic flow information corresponding to the road segments SG1 to SGD at the t-th time point may be represented as $\widehat{X_1}(t)$ to $\widehat{X_D}(t)$ respectively, but is not limited thereto.

Afterward, the server 110 may feed the statistical traffic flow information corresponding to each road segment SG1 to SGD (for example, $\widehat{X_1}(t)$ to $\widehat{X_D}(t)$) into a quantum neural network (QNN), in which the quantum neural network (hereinafter referred to as M1) determines the plurality of probabilities corresponding to each road segment SG1 to SGD in response to the statistical traffic flow information corresponding to each road segment SG1 to SGD.

In an embodiment, the plurality of probabilities corresponding to the d-th road segment at the t-th time point may be represented as:

$$P_d(t) = [P_{d,1}, P_{d,2}, \ldots , P_{d,S}]^T,$$

in which $P_{d,s}$ is an s-th probability among the plurality of probabilities corresponding to the d-th road segment, and S is a quantity of the plurality of probabilities corresponding to the d-th road segment. The s-th probability corresponds to an s-th candidate contention window size among the plurality of candidate contention window sizes. For example, the plurality of probabilities corresponding to a first road segment at the t-th time point may be represented as "$P_1(t)=[P_{1,1}, P_{1,2}, \ldots , P_{1,S}]^T$"; the plurality of probabilities corresponding to a second road segment at the t-th time point may be represented as "$P_2(t)=[P_{2,1}, P_{2,2}, \ldots , P_{2,S}]^T$"; the plurality of probabilities corresponding to a D-th road segment at the t-th time point may be represented as "$P_D(t)=[P_{D,1}, P_{D,2}, \ldots , P_{D,S}]^T$". In some embodiments, $P_1(t)$ to $P_D(t)$ are, for example, vectors whose length is S, respectively, but are not limited thereto.

Figure 3:
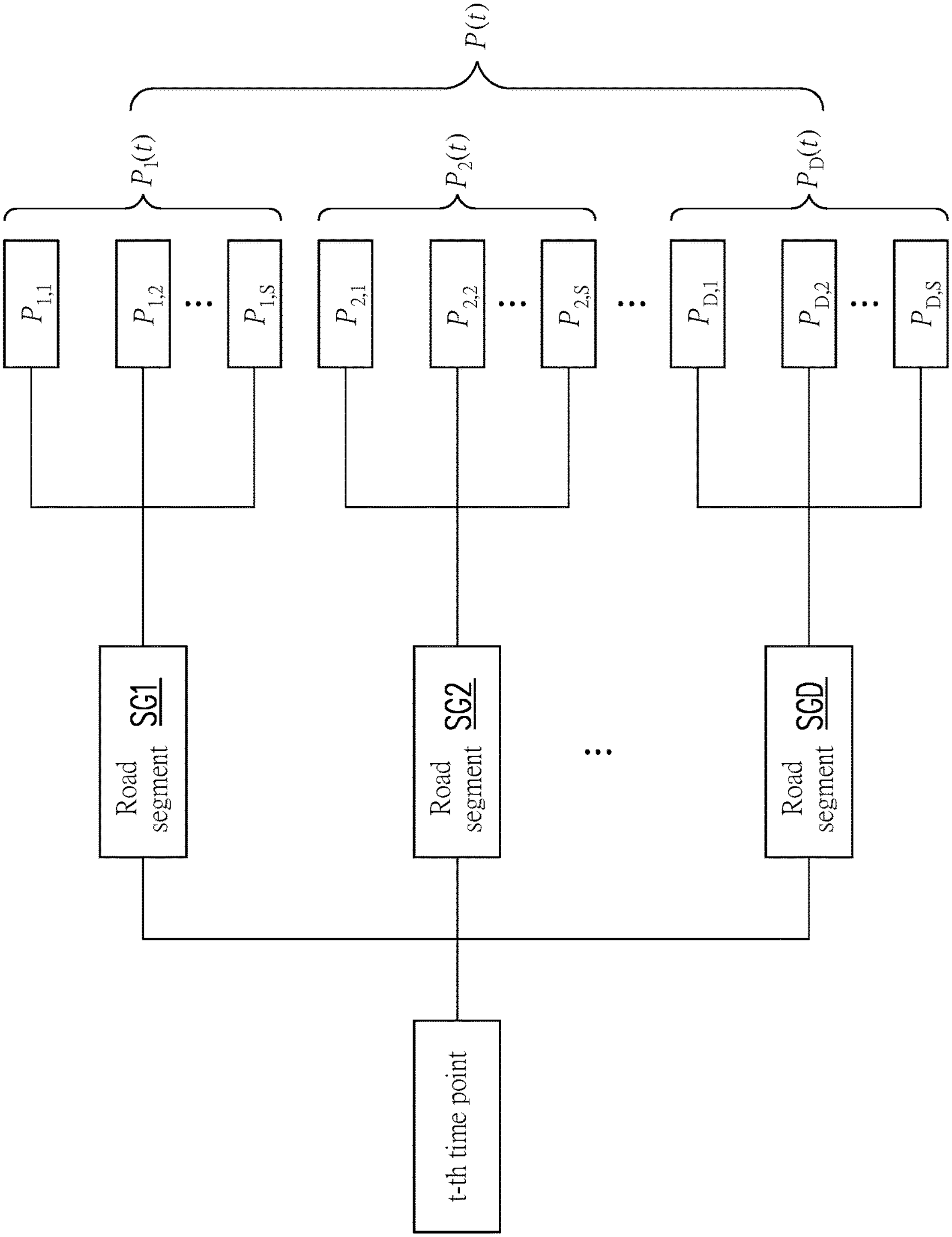
FIG. 3 is a schematic diagram of probabilities corresponding to road segments according to an embodiment of the disclosure.

Please refer to FIG. 3, which is a schematic diagram of probabilities corresponding to road segments SG1 to SGD according to an embodiment of the disclosure. In FIG. 3, the plurality of probabilities corresponding to each road segment SG1 to SGD determined by the quantum neural network M1 may be represented as "$P(t)=[P_1^T(t), P_2^T(t), \ldots , P_D^T(t)]^T$", and is, for example, a vector whose length is D*S, but is not limited thereto.

In an embodiment, in order to enable the quantum neural network M1 to have the above-mentioned capabilities, during a training process of the quantum neural network M1, the designer may feed specially designed training data into the quantum neural network M1, so that the quantum neural network M1 performs learning accordingly. For example, after obtaining the statistical traffic flow information of a road segment at a certain time point and selecting a corresponding probability of different contention window sizes, the server 110 may feed the statistical traffic flow information and the probability corresponding to different contention window sizes into the quantum neural network M1 in training as training data, so that the quantum neural network M1 performs learning accordingly.

Based on similar concepts, after feeding different statistical traffic flow information and corresponding contention window sizes into the training quantum neural network M1 as training data, the quantum neural network M1 may perform learning accordingly. Based on this, when new statistical traffic flow information (such as $\widehat{X_d}(t)$) is fed into the trained quantum neural network M1, the quantum neural network M1 may correspondingly predict/determine the probability corresponding to different contention window sizes (For example, $P_d(t)=[P_{d,1}, P_{d,2}, \ldots , P_{d,S}]^T$), but is not limited thereto.

Next, in Step S240, the server 110 determines the contention window size corresponding to each road segment SG1 to SGD based on the plurality of probabilities corresponding to each road segment SG1 to SGD.

In an embodiment, the server 110 may determine the contention window size corresponding to each road segment SG1 to SGD based on a similar method. For the convenience of description, one of the road segments SG1 to SGD (hereinafter referred to as the first road segment) is taken as an example for illustration.

In an embodiment, the probabilities corresponding to the first road segment include a maximum probability, and the maximum probability corresponds to a specific candidate contention window size among the plurality of candidate contention window sizes. In this case, the server 110 may select the specific candidate contention window size as the contention window size corresponding to the first road segment.

For example, assuming that the considered first road segment is the d-th road segment, in which the candidate contention window size corresponding to the d-th road segment is, for example, $CW_{d,1}(t)$ to $CW_{d,S}(t)$, and $CW_{d,1}(t)$ to $CW_{d,S}(t)$ correspond to $P_{d,1}$~$P_{d,S}$ in $P_d(t)$ respectively. In an embodiment, assuming that $P_{d,1}$ is the maximum probability in $P_d(t)$, then the server 110 may select $CW_{d,1}(t)$ corresponding to $P_{d,1}$(that is, a specific candidate contention window size corresponding to the maximum probability) as the contention window size corresponding to the d-th road segment.

In the scenario in FIG. 3, assuming that the first road segment considered is the road segment SG1, in which the candidate contention window size corresponding to the road segment SG1 is, for example, $CW_{1,1}(t)$ to $CW_{1,S}(t)$, and $CW_{1,1}(t)$ to $CW_{1,S}(t)$ correspond to $P_{1,1}$~$P_{1,S}$ in $P_1(t)$ respectively. In an embodiment, assuming that $P_{1,1}$ is the maximum probability in $P_1(t)$, then the server 110 may select $CW_{1,1}(t)$ corresponding to $P_{1,1}$ as the contention window size of the road segment SG1.

For another example, assuming that the first road segment considered is the road segment SG2, in which the candidate contention window size corresponding to the road segment SG2 is, for example, $CW_{2,1}(t)$ to $CW_{2,S}(t)$, and $CW_{2,1}(t)$ to $CW_{2,S}(t)$ correspond to $P_{2,1}$~$P_{2,S}$ in $P_2(t)$ respectively. In an embodiment, assuming that $P_{2,2}$ is the maximum probability in $P_2(t)$, then the server 110 may select $CW_{2,2}(t)$ corresponding to $P_{2,2}$ as the contention window size of the road segment SG2.

For still another example, assuming that the first road segment considered is the road segment SGD, in which the candidate contention window size corresponding to the road segment SGD is, for example, $CW_{D,1}(t)$ to $CW_{D,S}(t)$, and $CW_{D,1}(t)$ to $CW_{D,S}(t)$ correspond to $P_{D,1}$~$P_{D,S}$ in $P_D(t)$ respectively. In an embodiment, assuming that $P_{D,S}$ is the maximum probability in $P_D(t)$, then the server 110 may select $CW_{D,S}(t)$ corresponding to $P_{D,S}$ as the contention window size of the road segment SGD.

In other embodiments, the server 110 may also adjust the method of determining the specific candidate contention window size of each road segment SG1 to SGD according to the requirement of the designer, which is not limited to the method described in the above embodiments.

For example, assuming that the first road segment considered is the d-th road segment, and $P_{d,1}$ is a second highest probability in $P_d(t)$, then the server 110 may select $CW_{d,1}(t)$ corresponding to $P_{d,1}$ as the contention window size corresponding to the d-th road segment. That is, the server 110 may use the candidate contention window size corresponding to the second highest probability as the specific candidate contention window size, but is not limited thereto.

For the convenience of description, the vehicle positioned in the first road segment below is referred to as a first vehicle, but is not limited thereto. Based on this, after determining the contention window size corresponding to the first road segment, in Step S250, the server 110 controls a message retransmission mechanism of the plurality of first vehicles according to the contention window size corresponding to the first road segment.

In an embodiment, the server 110 may send a control command indicating the contention window size corresponding to the first road segment to each first vehicle through the RSU 120, so that each first vehicle may execute the message retransmission mechanism accordingly.

For ease of understanding, one of the plurality of first vehicles (hereinafter referred to as a reference vehicle) is taken as an example for illustration below.

In an embodiment, the reference vehicle (hereinafter referred to as RH) may receive the contention window size corresponding to the first road segment from the server 110 (through the RSU 120), and execute the message retransmission mechanism accordingly. That is, when the reference vehicle RH later executes a random backoff procedure for some reason, the reference vehicle RH waits for an additional, randomly selected duration of a time slot, and the randomly selected duration has to be greater than 0 and smaller than the contention window size corresponding to the first road segment.

Therefore, in an embodiment, in response to the reference vehicle RH determining that a first data packet has not been successfully broadcast, the reference vehicle RH executes a random backoff procedure based on the contention window size corresponding to the first road segment, so as to obtain a first backoff time slot (which corresponds to the randomly selected duration according to the method as above). For example, when the reference vehicle RH executes the random backoff procedure in a j-th time slot and randomly selects the duration (whose length is, for example, p time slots), the reference vehicle RH may use a j+p-th time slot as the first backoff time slot (j and p are positive integers), but is not limited thereto.

Afterward, the reference vehicle RH may attempt to broadcast the (previously not successfully broadcast) first data packet again in the first backoff time slot.

In some embodiments, the reference vehicle RH may also adaptively adjust the contention window size configured to execute the random backoff procedure according to the packet transmission conditions of the reference vehicle RH.

In an embodiment, in response to determining that the first data packet has expired, the reference vehicle RH may determine a first specific contention window size based on the contention window size corresponding to the first road segment.

In an embodiment, the reference vehicle RH may obtain a first reference contention window size by dividing the contention window size corresponding to the first road segment by a specific factor (for example, 2). Afterward, in response to determining that the first reference contention window size is smaller than a window size lower limit, which means that the reference vehicle RH is not allowed to use the first reference contention window size that is too low as the contention window size configured to execute the random backoff procedure. Based on this, the reference vehicle RH may use the contention window size corresponding to the first road segment as the first specific contention window size. That is, the reference vehicle RH may not change the contention window size configured to execute the random backoff procedure.

On the other hand, in response to determining that the first reference contention window size is not smaller than the window size lower limit, it means that the reference vehicle RH is allowed to use a low first reference contention window size as the contention window size configured to execute the random backoff procedure. Based on this, the reference vehicle RH may use the first reference contention window size as the first specific contention window size.

Afterward, in an embodiment, in response to the reference vehicle RH determining that a second data packet has not been successfully broadcast, the reference vehicle RH may execute the random backoff procedure based on the first specific contention window size, so as to obtain a second backoff time slot, and attempt to broadcast the second data packet again in the second backoff time slot.

In short, if the reference vehicle RH fails to successfully broadcast a certain data packet (such as the first data packet above) within a time limit and causes the data packet expire, the reference vehicle RH may adaptively reduce the contention window size configured to execute the random backoff procedure so subsequent data packets may be sent earlier with fewer backoff time slots.

In some embodiments, the above-described mechanisms may be repeatedly executed by the reference vehicle RH.

For example, in an embodiment, in response to determining that the second data packet has expired, the reference vehicle RH may determine a second specific contention window size based on the first specific contention window size. In an embodiment, the reference vehicle RH may obtain a second reference contention window size by dividing the first specific contention window size by a specific factor (for example, 2). Afterward, in response to determining that the second reference contention window size is smaller than a window size lower limit, which means that the reference vehicle RH is not allowed to use a second reference contention window size that is too low as the contention window size configured to execute the random backoff procedure. Based on this, the reference vehicle RH may use the first specific contention window size as the second specific contention window size. That is, the reference vehicle RH may not change the contention window size configured to execute the random backoff procedure.

On the other hand, in response to determining that the second reference contention window size is not smaller than the window size lower limit, it means that the reference vehicle RH is allowed to use a low second reference contention window size as the contention window size configured to execute the random backoff procedure. Based on this, the reference vehicle RH may use the second reference contention window size as the second specific contention window size.

Afterward, in an embodiment, in response to the reference vehicle RH determining that a third data packet has not been successfully broadcast, the reference vehicle RH may execute the random backoff procedure based on the second specific contention window size, so as to obtain a third backoff time slot, and attempt to broadcast the third data packet again in the third backoff time slot. Relevant details may be referred to the descriptions in the previous embodiments, and will not be repeated here.

In summary, the method of the embodiments of the disclosure may determine a plurality of probabilities corresponding to each road segment accordingly after obtaining the current traffic flow information of each road segment, and the plurality of probabilities correspond to a plurality of candidate contention window sizes respectively. Afterward, the method of the embodiments of the disclosure may select the contention window size corresponding to each road segment according to the plurality of corresponding probabilities, and control the message retransmission mechanism of each vehicle in each road segment accordingly. In this way, a suitable contention window size may be selected for the vehicle in each road segment, so that the vehicle in each road segment may execute a message retransmission mechanism such as a random backoff procedure well.

From another point of view, most of the common traffic forecasting models and forecasting methods use linear time series models, such as autoregressive model, moving average model, autoregressive moving average model, and autoregressive integrated moving average model.

Since the time series of network traffic is a nonlinear process, traditional linear models cannot capture the uncertainty and time-varying nature of network traffic. How to capture abnormal/individual/prominent traffic characteristics, such as self-similarity on large time scales, short-range dependencies, multifractals on small time scales. Considering the influence of individual heterogeneity on traffic volume, the embodiments of the disclosure use probability-time as the theory to capture individual characteristics or abnormal events, supplemented by quantum neural network, and proposes a backoff mechanism which comprehensively considers the relationship between uncertainties of the dynamic developing traffic volume, vehicle speed, and contention window.

Specifically, the embodiments of the disclosure speculate that the movement information of the vehicle and the vehicle communication information are time-varying, uncertain, and has a trade-off relationship (which is similar to the form of uncertainty principle of Heisenberg), and estimates probabilities corresponding to different contention window sizes accordingly.

In theory, neural networks may provide a good performance in handling non-linear relationships between output and input. Neural networks have been successfully used to model complex nonlinear systems and predict signals for a wide range of engineering applications. However, to make artificial intelligence realistic, the key bottleneck is the calculation speed, and one of the main differences between classical data and quantum data is that quantum data cannot be copied.

Since the movement information and the vehicle communication information of vehicles are affected by different factors (such as weather, traffic accidents, speed of adjacent vehicles) every second, in order to obtain a suitable contention window for each time slot in different traffic flows, in principle, infinite samples are required, which would result in an exponential demand on classical computing resources.

A typical data-driven model regards traffic volume as a random process and extracts or learns structural patterns from massive historical data of traffic volume, and then simulates traffic volume. Therefore, data-driven models require representative high-quality training data to achieve accurate simulations. However, data-driven models also have other problems. For example, failure to consider the influence of individual heterogeneity on traffic volume makes it difficult to reflect/represent abnormal events, which also limits the applicability of data-driven models to simulate traffic volume.

To improve the above problems, many models add individually accurate status information (e.g., speed, acceleration, distance between vehicles) to increase the fine granularity. However, it is difficult to collect such accurate status information in high-speed or heavy-vehicle traffic.

Even when such accurate status information is available, complex calculations are still required to construct individual parameter sets. Some studies also estimate average status parameters by using empirical parameters or simple statistical methods, but still, the effect of individual heterogeneity cannot be reflected.

The instantaneous processing of massive amounts of data by quantum technology has become one of promising tools in the field of machine learning. Quantum computing is a new computing method based on the laws of quantum mechanics, using quantum properties such as superposition, entanglement, and interference of quantum states. The combination of quantum computing and neural networks produces quantum neural networks. Therefore, to address the above requirements, it is one of the spirits of the embodiments of the disclosure to apply quantum computing and simulate traffic flow based on individual heterogeneity.

Due to individual heterogeneity, a position of vehicle in high-speed traffic changes irregularly, making it difficult to describe the traffic flow. Since it is difficult to determine the exact position of the vehicle, the general method is to use the average position (the ideal position for driving at an average speed) to approximate the description. Furthermore, the position of the vehicle fluctuates around the corresponding average position at each time slot, forming a "probability-time" distribution. In other words, the irregular evolution of vehicle positions is difficult to describe with a classical deterministic framework. Therefore, from the perspective of uncertainty, it is a feasible and accurate method to express in the form of probability, which is the starting point of the embodiments of the disclosure.

Although the disclosure has been disclosed above with the embodiments, the embodiments are not intended to limit the disclosure. Persons with ordinary knowledge in the technical field may make some changes and modifications without departing from the spirit and scope of the disclosure. The scope of protection of the disclosure should be defined by the appended claims.

What is claimed is:

1. A method for adjusting a backoff mechanism suitable for a vehicle communication system, wherein the vehicle communication system comprises a server, comprising:

obtaining vehicle information of each of a plurality of vehicles in a plurality of road segments by the server, wherein the vehicle information of each of the plurality of vehicles comprises corresponding communication information and movement information, the plurality of road segments comprise a first road segment, and the plurality of vehicles comprise a plurality of first vehicles positioned in the first road segment;

determining current traffic flow information of each of the plurality of road segments based on the vehicle information of each of the plurality of vehicles by the server;

determining a plurality of probabilities corresponding to each of the plurality of road segments at least according to the current traffic flow information of each of the plurality of road segments by the server, wherein the plurality of probabilities corresponding to each of the plurality of road segments correspond to a plurality of candidate contention window sizes respectively;

determining a contention window size corresponding to each of the plurality of road segments based on the plurality of probabilities corresponding to each of the plurality of road segments by the server; and controlling a message retransmission mechanism of the plurality of first vehicles according to the contention window size corresponding to the first road segment by the server.

2. The method according to claim 1, wherein the server obtains the vehicle information of each of the plurality of vehicles from a roadside unit that manages the plurality of road segments.

3. The method according to claim 1, wherein the communication information of each of the plurality of vehicles comprises vehicle communication information corresponding to each of the plurality of vehicles, and the movement information of each of the plurality of vehicles comprises a corresponding vehicle position and a moving speed.

4. The method according to claim 3, wherein the vehicle communication information corresponding to each of the plurality of vehicles comprises road condition information.

5. The method according to claim 3, wherein the current traffic flow information of a d-th road segment of the plurality of road segments is represented as:

$$X_d(t) = [x_{d,1}(t), x_{d,2}(t), \ldots, x_{d,V}(t)],$$

wherein t is a time index value, $x_{d,i}(t)$ represents the vehicle information of an i-th vehicle among a plurality of vehicles in the d-th road segment, $1 \leq i \leq V$, i is an integer, and V is a quantity of the plurality of vehicles in the d-th road segment.

6. The method according to claim 5, wherein:

$$x_{d,i}(t) = \begin{bmatrix} R_{speed_{d,i}}(t) \\ R_{pos_{d,i}}(t) \\ M_{d,i}(t) \end{bmatrix},$$

wherein $R_{speed_{d,i}}(t)$ is a moving speed of the i-th vehicle in the d-th road segment, $R_{pos_{d,i}}(t)$ is a vehicle position of the i-th vehicle in the d-th road segment, and $M_{d,i}(t)$ is vehicle communication information of the i-th vehicle in the d-th road segment.

7. The method according to claim 1, wherein determining the plurality of probabilities corresponding to each of the plurality of road segments at least according to the current traffic flow information of each of the plurality of road segments comprises:

obtaining at least one piece of historical traffic flow information of each of the plurality of road segments from the server;

determining the plurality of probabilities corresponding to each of the plurality of road segments based on the current traffic flow information and the at least one piece of historical traffic flow information corresponding to each of the plurality of road segments by the server.

8. The method according to claim 7, wherein determining the plurality of probabilities corresponding to each of the plurality of road segments based on the current traffic flow information and the at least one piece of historical traffic flow information of each of the plurality of road segments comprises:

integrating the current traffic flow information and the at least one piece of historical traffic flow information of each of the plurality of road segments into corresponding statistical traffic flow information;

feeding the statistical traffic flow information corresponding to each of the plurality of road segments into a quantum neural network, wherein the quantum neural network determines the plurality of probabilities corresponding to each of the plurality of road segments in response to the statistical traffic flow information corresponding to each of the plurality of road segments.

9. The method according to claim 8, wherein the statistical traffic flow information of the d-th road segment in the plurality of road segments is represented as:

$$\widehat{X_d}(t) = \sum_{k=0}^{M} h_0(k) X_d(t-k),$$

wherein t is the time index value, $h_0(k)$ is a k-th coefficient in an impulse response, $X_d(t-k)$ is one of the at least one piece of historical traffic flow information corresponding to a t-k-th time point, and M is a quantity of the at least one piece of historical traffic flow information.

10. The method according to claim 8, wherein the plurality of probabilities corresponding to the d-th road segment are represented as:

$$P_d(t) = [P_{d,1}, P_{d,2}, \ldots, P_{d,S}]^T,$$

wherein $P_{d,s}$ is an s-th probability among the plurality of probabilities corresponding to the d-th road segment, S is a quantity of the plurality of probabilities corresponding to the d-th road segment, and the s-th probability corresponds to an s-th candidate contention window size among the plurality of candidate contention window sizes.

11. The method according to claim 10, wherein the plurality of probabilities corresponding to each of the plurality of road segments determined by the quantum neural network are represented as:

$$P(t) = \left[P_1^T(t), P_2^T(t), \ldots, P_D^T(t)\right]^T,$$

wherein D is a quantity of the plurality of road segments.

12. A method according to claim 1, wherein the plurality of probabilities corresponding to the first road segment comprise a maximum probability, the maximum probability corresponds to a specific candidate contention window size among the plurality of candidate contention window sizes, and the contention window size corresponding to the first road segment is the specific candidate contention window size.

13. The method according to claim 1, wherein the vehicle communication system further comprises a reference vehicle among the plurality of first vehicles, and the method further comprises:

receiving the contention window size corresponding to the first road segment from the server by the reference vehicle;

in response to the reference vehicle determining that a first data packet has not been successfully broadcast, executing a random backoff procedure based on the contention window size corresponding to the first road segment by the reference vehicle, so as to obtain a first backoff time slot;

attempting to broadcast the first data packet again in the first backoff time slot by the reference vehicle.

14. The method according to claim 13, further comprising:

in response to determining that the first data packet has expired, determining a first specific contention window size based on the contention window size corresponding to the first road segment by the reference vehicle;

in response to the reference vehicle determining that a second data packet has not been successfully broadcast, executing the random backoff procedure based on the first specific contention window size by the reference vehicle, so as to obtain a second backoff time slot;

attempting to broadcast the second data packet again in the second backoff time slot by the reference vehicle.

15. The method according to claim 14, wherein determining the first specific contention window size based on the contention window size corresponding to the first road segment by the reference vehicle comprises:

obtaining a first reference contention window size by dividing the contention window size corresponding to the first road segment by a specific factor;

in response to determining that the first reference contention window size is smaller than a window size lower limit, the contention window size corresponding to the first road segment is used as the first specific contention window size;

in response to determining that the first reference contention window size is not smaller than the window size lower limit, the first reference contention window size is used as the first specific contention window size.

16. The method according to claim 14, further comprising:

in response to determining that the second data packet has expired, determining a second specific contention window size based on the first specific contention window size by the reference vehicle;

in response to the reference vehicle determining that a third data packet has not been successfully broadcast, executing the random backoff procedure based on the second specific contention window size by the reference vehicle, so as to obtain a third backoff time slot;

attempting to broadcast the third data packet again in the third backoff time slot by the reference vehicle.

17. The method according to claim 16, wherein determining the second specific contention window size based on the first specific contention window size by the reference vehicle comprises:

obtaining a second reference contention window size by dividing the first specific contention window size by a specific factor;

in response to determining that the second reference contention window size is smaller than a window size lower limit, the first specific contention window size is used as the second specific contention window size;

in response to determining that the second reference contention window size is not smaller than the window size lower limit, the second reference contention window size is used as the second specific contention window size.

18. A vehicle communication system, comprising:

a server configured to:

obtain vehicle information of each of a plurality of vehicles in a plurality of road segments, wherein the vehicle information of each of the plurality of vehicles comprises corresponding communication information and movement information, the plurality of road segments comprise a first road segment, and the plurality of vehicles comprise a plurality of first vehicles positioned in the first road segment;

determine current traffic flow information of each of the plurality of road segments based on the vehicle information of each of the plurality of vehicles;

determine a plurality of probabilities corresponding to each of the plurality of road segments at least according to the current traffic flow information of each of the plurality of road segments, wherein the plurality of probabilities corresponding to each of the plurality of road segments correspond to a plurality of candidate contention window sizes respectively;

determine a contention window size corresponding to each of the plurality of road segments based on the plurality of probabilities corresponding to each of the plurality of road segments; and control a message retransmission mechanism of the plurality of first vehicles according to the contention window size corresponding to the first road segment.

19. The vehicle communication system according to claim 18, further comprising a reference vehicle among the plurality of first vehicles, and the reference vehicle is configured to:

receive the contention window size corresponding to the first road segment from the server;

in response to the reference vehicle determining that a first data packet has not been successfully broadcast, executing a random backoff procedure based on the contention window size corresponding to the first road segment, so as to obtain a first backoff time slot;

attempting to broadcast the first data packet again in the first backoff time slot.

* * * * *